US009064333B2

(12) United States Patent
Crow et al.

(10) Patent No.: US 9,064,333 B2
(45) Date of Patent: *Jun. 23, 2015

(54) INTERRUPT HANDLING TECHNIQUES IN THE RASTERIZER OF A GPU (75) Inventors: Franklin C. Crow, Portola Valley, CA (US); Jeffrey R. Sewall, Pleasanton, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1736 days.

This patent is subject to a terminal disclaimer.

(21) Appl. No.: 12/002,727

(22) Filed: Dec. 17, 2007

(65) Prior Publication Data
US 2009/0153573 A1    Jun. 18, 2009

(51) Int. Cl.
G06T 1/00 (2006.01)
G06T 15/00 (2011.01)
G06F 9/48 (2006.01)

(52) U.S. Cl.
CPC ............ G06T 15/005 (2013.01); G06F 9/4812 (2013.01)

(58) Field of Classification Search
None
See application file for complete search history.

(56) References Cited

U.S. PATENT DOCUMENTS

| | | | |
|---|---|---|---|
| 3,091,657 A | 5/1963 | Stuessel | |
| 3,614,740 A | 10/1971 | Delagi et al. | |
| 3,987,291 A | 10/1976 | Gooding et al. | |
| 4,101,960 A | 7/1978 | Stokes et al. | |
| 4,208,810 A | 6/1980 | Rohner et al. | |
| 4,541,046 A | 9/1985 | Nagashima et al. | |
| 4,566,005 A | 1/1986 | Apperley et al. | |
| 4,748,585 A | 5/1988 | Chiarulli et al. | |
| 4,897,717 A | 1/1990 | Hamilton et al. | |
| 4,918,626 A | 4/1990 | Watkins et al. | |
| 4,958,303 A | 9/1990 | Assarpour et al. | |
| 4,965,716 A | 10/1990 | Sweeney | |
| 4,965,751 A | 10/1990 | Thayer et al. | |
| 4,985,848 A | 1/1991 | Pfeiffer et al. | |

(Continued)

FOREIGN PATENT DOCUMENTS

CN          101093578       12/2007
DE          29606102        4/1996

(Continued)

OTHER PUBLICATIONS

"Alpha Testing State"; http://msdn.microsoft.com/library/en-us/directx9_c/directx/graphics/programmingguide/GettingStarted/Direct3Kdevices/States/renderstates/alphatestingstate.asp Mar. 25, 2005.

(Continued)

*Primary Examiner* — Maurice L McDowell, Jr.
*Assistant Examiner* — Donna Ricks (57) ABSTRACT

Techniques for handling an interrupt in the rasterizer, in accordance with embodiment of the present technology, start with rasterizing one or more primitives of a first context. If an interrupt is received, the tile count of tiles of a current primitive that have been coarse rasterized is saved in a backing store. After storing the tile count, the one or more primitives of a second context are rasterized. After the second context is served, the coarse rasterization of the current primitive of the previous context is rerun without output until the tile corresponding to the stored tile count is coarse rasterized. Thereafter, rasterization of the current primitive of the first context from the next tile beyond the stored tile count is continued until rasterization is completed or another interrupt is received and the above described process is repeated.

18 Claims, 7 Drawing Sheets

(56) References Cited

U.S. PATENT DOCUMENTS

| | | |
|---|---|---|
| 5,040,109 A | 8/1991 | Bowhill et al. |
| 5,047,975 A | 9/1991 | Patti et al. |
| 5,081,594 A | 1/1992 | Horsley |
| 5,175,828 A | 12/1992 | Hall et al. |
| 5,179,530 A | 1/1993 | Genusov et al. |
| 5,197,130 A | 3/1993 | Chen et al. |
| 5,210,834 A | 5/1993 | Zurawski et al. |
| 5,263,136 A | 11/1993 | DeAguiar et al. |
| 5,287,438 A | 2/1994 | Kelleher |
| 5,313,287 A | 5/1994 | Barton |
| 5,327,369 A | 7/1994 | Ashkenazi |
| 5,357,623 A | 10/1994 | Megory-Cohen |
| 5,375,223 A | 12/1994 | Meyers et al. |
| 5,388,206 A | 2/1995 | Poulton et al. |
| 5,388,245 A | 2/1995 | Wong |
| 5,418,973 A | 5/1995 | Ellis et al. |
| 5,421,029 A | 5/1995 | Yoshida |
| 5,430,841 A | 7/1995 | Tannenbaum et al. |
| 5,430,884 A | 7/1995 | Beard et al. |
| 5,432,898 A | 7/1995 | Curb et al. |
| 5,432,905 A | 7/1995 | Hsieh et al. |
| 5,446,836 A | 8/1995 | Lentz et al. |
| 5,452,104 A | 9/1995 | Lee |
| 5,452,412 A | 9/1995 | Johnson, Jr. et al. |
| 5,483,258 A | 1/1996 | Cornett et al. |
| 5,517,666 A | 5/1996 | Ohtani et al. |
| 5,522,080 A | 5/1996 | Harney |
| 5,543,935 A | 8/1996 | Harrington |
| 5,560,030 A | 9/1996 | Guttag et al. |
| 5,561,808 A | 10/1996 | Kuma et al. |
| 5,570,463 A | 10/1996 | Dao |
| 5,574,944 A | 11/1996 | Stager |
| 5,594,854 A | 1/1997 | Baldwin et al. |
| 5,610,657 A | 3/1997 | Zhang |
| 5,623,692 A | 4/1997 | Priem et al. |
| 5,627,988 A | 5/1997 | Oldfield |
| 5,633,297 A | 5/1997 | Valko et al. |
| 5,644,753 A | 7/1997 | Ebrahim et al. |
| 5,649,173 A | 7/1997 | Lentz |
| 5,664,162 A | 9/1997 | Dye |
| 5,666,169 A | 9/1997 | Ohki et al. |
| 5,682,552 A | 10/1997 | Kuboki et al. |
| 5,682,554 A | 10/1997 | Harrell |
| 5,706,478 A | 1/1998 | Dye |
| 5,708,511 A | 1/1998 | Gandhi et al. |
| 5,754,191 A | 5/1998 | Mills et al. |
| 5,761,476 A | 6/1998 | Martell |
| 5,764,243 A * | 6/1998 | Baldwin ................. 345/506 |
| 5,784,590 A | 7/1998 | Cohen et al. |
| 5,784,640 A | 7/1998 | Asghar et al. |
| 5,796,974 A | 8/1998 | Goddard et al. |
| 5,802,574 A | 9/1998 | Atallah et al. |
| 5,809,524 A | 9/1998 | Singh et al. |
| 5,812,147 A | 9/1998 | Van Hook et al. |
| 5,815,162 A | 9/1998 | Levine |
| 5,835,740 A | 11/1998 | Wise et al. |
| 5,835,788 A | 11/1998 | Blumer et al. |
| 5,848,192 A | 12/1998 | Smith et al. |
| 5,848,254 A | 12/1998 | Hagersten |
| 5,854,631 A | 12/1998 | Akeley et al. |
| 5,854,637 A | 12/1998 | Sturges |
| 5,872,902 A | 2/1999 | Kuchkuda et al. |
| 5,920,352 A | 7/1999 | Inoue |
| 5,925,124 A | 7/1999 | Hilgendorf et al. |
| 5,940,090 A | 8/1999 | Wilde |
| 5,940,858 A | 8/1999 | Green |
| 5,949,410 A | 9/1999 | Fung |
| 5,950,012 A | 9/1999 | Shiell et al. |
| 5,977,987 A | 11/1999 | Duluk, Jr. |
| 5,978,838 A | 11/1999 | Mohamed et al. |
| 5,999,199 A | 12/1999 | Larson |
| 6,009,454 A | 12/1999 | Dummermuth |
| 6,016,474 A | 1/2000 | Kim et al. |
| 6,028,608 A | 2/2000 | Jenkins |
| 6,034,699 A | 3/2000 | Wong et al. |
| 6,041,399 A | 3/2000 | Terada et al. |
| 6,049,672 A | 4/2000 | Shiell et al. |
| 6,072,500 A | 6/2000 | Foran et al. |
| 6,073,158 A | 6/2000 | Nally et al. |
| 6,092,094 A | 7/2000 | Ireton |
| 6,104,407 A | 8/2000 | Aleksic et al. |
| 6,104,417 A | 8/2000 | Nielsen et al. |
| 6,108,766 A | 8/2000 | Hahn et al. |
| 6,112,019 A | 8/2000 | Chamdani et al. |
| 6,115,049 A | 9/2000 | Winner et al. |
| 6,118,394 A | 9/2000 | Onaya |
| 6,128,000 A | 10/2000 | Jouppi et al. |
| 6,131,152 A | 10/2000 | Ang et al. |
| 6,137,918 A | 10/2000 | Harrington et al. |
| 6,141,740 A | 10/2000 | Mahalingaiah et al. |
| 6,144,392 A | 11/2000 | Rogers |
| 6,150,610 A | 11/2000 | Sutton |
| 6,160,557 A | 12/2000 | Narayanaswami |
| 6,160,559 A * | 12/2000 | Omtzigt ................. 345/503 |
| 6,188,394 B1 | 2/2001 | Morein et al. |
| 6,189,068 B1 | 2/2001 | Witt et al. |
| 6,192,073 B1 | 2/2001 | Reader et al. |
| 6,192,458 B1 | 2/2001 | Arimilli et al. |
| 6,201,545 B1 | 3/2001 | Wong et al. |
| 6,204,859 B1 | 3/2001 | Jouppi et al. |
| 6,208,361 B1 | 3/2001 | Gossett |
| 6,209,078 B1 | 3/2001 | Chiang et al. |
| 6,219,070 B1 | 4/2001 | Baker et al. |
| 6,222,552 B1 | 4/2001 | Haas et al. |
| 6,230,254 B1 | 5/2001 | Senter et al. |
| 6,239,810 B1 | 5/2001 | Van Hook et al. |
| 6,247,094 B1 | 6/2001 | Kumar et al. |
| 6,249,853 B1 | 6/2001 | Porterfield |
| 6,252,610 B1 | 6/2001 | Hussain |
| 6,259,460 B1 | 7/2001 | Gossett et al. |
| 6,292,886 B1 | 9/2001 | Makineni et al. |
| 6,301,600 B1 | 10/2001 | Petro et al. |
| 6,314,493 B1 | 11/2001 | Luick |
| 6,317,819 B1 | 11/2001 | Morton |
| 6,323,874 B1 | 11/2001 | Gossett |
| 6,351,808 B1 | 2/2002 | Joy et al. |
| 6,359,623 B1 | 3/2002 | Larson |
| 6,362,819 B1 | 3/2002 | Dalal et al. |
| 6,366,289 B1 | 4/2002 | Johns |
| 6,370,617 B1 | 4/2002 | Lu et al. |
| 6,429,877 B1 | 8/2002 | Stroyan |
| 6,437,780 B1 | 8/2002 | Baltaretu et al. |
| 6,437,789 B1 | 8/2002 | Tidwell et al. |
| 6,438,664 B1 | 8/2002 | McGrath et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,480,927 B1 | 11/2002 | Bauman |
| 6,490,654 B2 | 12/2002 | Wickeraad et al. |
| 6,496,902 B1 | 12/2002 | Faanes et al. |
| 6,499,090 B1 | 12/2002 | Hill et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,525,737 B1 | 2/2003 | Duluk, Jr. et al. |
| 6,529,201 B1 | 3/2003 | Ault et al. |
| 6,529,207 B1 | 3/2003 | Landau et al. |
| 6,597,357 B1 | 7/2003 | Thomas |
| 6,603,481 B1 | 8/2003 | Kawai et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,818 B1 | 9/2003 | Mantor et al. |
| 6,624,823 B2 | 9/2003 | Deering |
| 6,629,188 B1 | 9/2003 | Minkin et al. |
| 6,631,423 B1 | 10/2003 | Brown et al. |
| 6,631,463 B1 | 10/2003 | Floyd et al. |
| 6,633,197 B1 | 10/2003 | Sutardja |
| 6,633,297 B2 | 10/2003 | McCormack et al. |
| 6,646,639 B1 | 11/2003 | Greene et al. |
| 6,657,635 B1 | 12/2003 | Hutchins et al. |
| 6,658,447 B2 | 12/2003 | Cota-Robles |
| 6,671,000 B1 | 12/2003 | Cloutier |

(56) References Cited

U.S. PATENT DOCUMENTS

| | | |
|---|---|---|
| 6,674,841 B1 | 1/2004 | Johns et al. |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,700,588 B1 | 3/2004 | MacInnis et al. |
| 6,715,035 B1 | 3/2004 | Colglazier et al. |
| 6,717,576 B1 | 4/2004 | Duluk, Jr. et al. |
| 6,717,578 B1 | 4/2004 | Deering |
| 6,731,288 B2 * | 5/2004 | Parsons et al. ............... 345/502 |
| 6,732,242 B2 | 5/2004 | Hill et al. |
| 6,734,861 B1 | 5/2004 | Van Dyke et al. |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,803,916 B2 | 10/2004 | Ramani et al. |
| 6,809,732 B2 | 10/2004 | Zatz et al. |
| 6,812,929 B2 | 11/2004 | Lavelle et al. |
| 6,819,332 B2 | 11/2004 | Baldwin |
| 6,825,843 B2 | 11/2004 | Allen et al. |
| 6,825,848 B1 | 11/2004 | Fu et al. |
| 6,833,835 B1 | 12/2004 | van Vugt |
| 6,839,062 B2 | 1/2005 | Aronson et al. |
| 6,862,027 B2 | 3/2005 | Andrews et al. |
| 6,891,543 B2 | 5/2005 | Wyatt |
| 6,906,716 B2 | 6/2005 | Moreton et al. |
| 6,915,385 B1 | 7/2005 | Leasure et al. |
| 6,938,176 B1 | 8/2005 | Alben et al. |
| 6,940,514 B1 | 9/2005 | Wasserman et al. |
| 6,944,744 B2 | 9/2005 | Ahmed et al. |
| 6,947,057 B2 | 9/2005 | Nelson et al. |
| 6,952,214 B2 | 10/2005 | Naegle et al. |
| 6,956,579 B1 | 10/2005 | Diard et al. |
| 6,961,057 B1 | 11/2005 | Van Dyke et al. |
| 6,965,982 B2 | 11/2005 | Nemawarkar |
| 6,975,324 B1 | 12/2005 | Valmiki et al. |
| 6,976,126 B2 | 12/2005 | Clegg et al. |
| 6,978,149 B1 | 12/2005 | Morelli et al. |
| 6,978,317 B2 | 12/2005 | Anantha et al. |
| 6,978,457 B1 | 12/2005 | Johl et al. |
| 6,981,106 B1 | 12/2005 | Bauman et al. |
| 6,985,151 B1 | 1/2006 | Bastos et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,015,909 B1 | 3/2006 | Morgan III et al. |
| 7,031,330 B1 | 4/2006 | Bianchini, Jr. |
| 7,032,097 B2 | 4/2006 | Alexander et al. |
| 7,035,979 B2 | 4/2006 | Azevedo et al. |
| 7,061,495 B1 | 6/2006 | Leather |
| 7,064,771 B1 | 6/2006 | Jouppi et al. |
| 7,075,542 B1 | 7/2006 | Leather |
| 7,081,902 B1 | 7/2006 | Crow et al. |
| 7,119,809 B1 | 10/2006 | McCabe |
| 7,126,600 B1 | 10/2006 | Fowler et al. |
| 7,148,888 B2 | 12/2006 | Huang |
| 7,151,544 B2 | 12/2006 | Emberling |
| 7,154,066 B2 | 12/2006 | Talwar et al. |
| 7,154,500 B2 | 12/2006 | Heng et al. |
| 7,158,148 B2 | 1/2007 | Toji et al. |
| 7,159,212 B2 | 1/2007 | Schenk et al. |
| 7,170,515 B1 | 1/2007 | Zhu |
| 7,184,040 B1 | 2/2007 | Tzvetkov |
| 7,185,178 B1 | 2/2007 | Barreh et al. |
| 7,202,872 B2 | 4/2007 | Paltashev et al. |
| 7,224,364 B1 | 5/2007 | Yue et al. |
| 7,260,677 B1 | 8/2007 | Vartti et al. |
| 7,305,540 B1 | 12/2007 | Trivedi et al. |
| 7,307,628 B1 | 12/2007 | Goodman et al. |
| 7,307,638 B2 | 12/2007 | Leather et al. |
| 7,321,787 B2 | 1/2008 | Kim |
| 7,334,110 B1 | 2/2008 | Faanes et al. |
| 7,369,815 B2 | 5/2008 | Kang et al. |
| 7,373,478 B2 | 5/2008 | Yamazaki |
| 7,382,368 B1 | 6/2008 | Molnar et al. |
| 7,406,698 B2 | 7/2008 | Richardson |
| 7,412,570 B2 | 8/2008 | Moll et al. |
| 7,453,466 B2 | 11/2008 | Hux et al. |
| 7,483,029 B2 | 1/2009 | Crow et al. |
| 7,486,290 B1 | 2/2009 | Kilgariff et al. |
| 7,487,305 B2 | 2/2009 | Hill et al. |
| 7,493,452 B2 | 2/2009 | Eichenberger et al. |
| 7,545,381 B2 | 6/2009 | Huang et al. |
| 7,548,996 B2 | 6/2009 | Baker et al. |
| 7,551,174 B2 | 6/2009 | Iourcha et al. |
| 7,564,460 B2 | 7/2009 | Boland et al. |
| 7,633,506 B1 | 12/2009 | Leather et al. |
| 7,634,637 B1 | 12/2009 | Lindholm et al. |
| 7,714,747 B2 | 5/2010 | Fallon |
| 7,750,913 B1 | 7/2010 | Parenteau et al. |
| 7,777,748 B2 | 8/2010 | Bakalash et al. |
| 7,791,617 B2 | 9/2010 | Crow et al. |
| 7,852,341 B1 | 12/2010 | Rouet et al. |
| 7,869,835 B1 | 1/2011 | Zu |
| 7,957,465 B2 | 6/2011 | Dei et al. |
| 7,965,902 B1 | 6/2011 | Zelinka et al. |
| 8,020,169 B2 | 9/2011 | Yamasaki |
| 8,063,903 B2 | 11/2011 | Vignon et al. |
| 8,139,070 B1 * | 3/2012 | Ostiguy et al. ............... 345/522 |
| 8,780,123 B2 | 7/2014 | Crow et al. |
| 2001/0005209 A1 | 6/2001 | Lindholm et al. |
| 2001/0026647 A1 | 10/2001 | Morita |
| 2002/0050979 A1 | 5/2002 | Oberoi et al. |
| 2002/0097241 A1 | 7/2002 | McCormack et al. |
| 2002/0114402 A1 | 8/2002 | Doetsch et al. |
| 2002/0116595 A1 | 8/2002 | Morton |
| 2002/0130863 A1 | 9/2002 | Baldwin |
| 2002/0130874 A1 | 9/2002 | Baldwin |
| 2002/0140655 A1 | 10/2002 | Liang et al. |
| 2002/0144061 A1 | 10/2002 | Faanes et al. |
| 2002/0158885 A1 | 10/2002 | Brokenshire et al. |
| 2002/0194430 A1 | 12/2002 | Cho |
| 2002/0196251 A1 | 12/2002 | Duluk, Jr. et al. |
| 2003/0001847 A1 | 1/2003 | Doyle et al. |
| 2003/0003943 A1 | 1/2003 | Bajikar |
| 2003/0014457 A1 | 1/2003 | Desai et al. |
| 2003/0016217 A1 | 1/2003 | Vlachos et al. |
| 2003/0016844 A1 | 1/2003 | Numaoka |
| 2003/0031258 A1 | 2/2003 | Wang et al. |
| 2003/0067468 A1 | 4/2003 | Duluk, Jr. et al. |
| 2003/0067473 A1 | 4/2003 | Taylor et al. |
| 2003/0076325 A1 | 4/2003 | Thrasher |
| 2003/0122815 A1 | 7/2003 | Deering |
| 2003/0163589 A1 | 8/2003 | Bunce et al. |
| 2003/0172326 A1 | 9/2003 | Coffin, III et al. |
| 2003/0188118 A1 | 10/2003 | Jackson |
| 2003/0194116 A1 | 10/2003 | Wong et al. |
| 2003/0201994 A1 | 10/2003 | Taylor et al. |
| 2003/0204673 A1 | 10/2003 | Venkumahanti et al. |
| 2003/0204680 A1 | 10/2003 | Hardage, Jr. |
| 2003/0227461 A1 | 12/2003 | Hux et al. |
| 2004/0012597 A1 | 1/2004 | Zatz et al. |
| 2004/0049379 A1 | 3/2004 | Thumpudi et al. |
| 2004/0073771 A1 | 4/2004 | Chen et al. |
| 2004/0073773 A1 | 4/2004 | Demjanenko |
| 2004/0085313 A1 | 5/2004 | Moreton et al. |
| 2004/0103253 A1 | 5/2004 | Kamei et al. |
| 2004/0130552 A1 | 7/2004 | Duluk, Jr. et al. |
| 2004/0183801 A1 | 9/2004 | Deering |
| 2004/0193837 A1 | 9/2004 | Devaney et al. |
| 2004/0196285 A1 | 10/2004 | Rice et al. |
| 2004/0205326 A1 | 10/2004 | Sindagi et al. |
| 2004/0207642 A1 | 10/2004 | Crisu et al. |
| 2004/0212730 A1 | 10/2004 | MacInnis et al. |
| 2004/0215887 A1 | 10/2004 | Starke |
| 2004/0221117 A1 | 11/2004 | Shelor |
| 2004/0246251 A1 | 12/2004 | Fenney et al. |
| 2004/0263519 A1 | 12/2004 | Andrews et al. |
| 2005/0002454 A1 | 1/2005 | Ueno et al. |
| 2005/0012759 A1 | 1/2005 | Valmiki et al. |
| 2005/0024369 A1 | 2/2005 | Xie |
| 2005/0030314 A1 | 2/2005 | Dawson |

(56) References Cited

U.S. PATENT DOCUMENTS

| | | |
|---|---|---|
| 2005/0041037 A1 | 2/2005 | Dawson |
| 2005/0066148 A1 | 3/2005 | Luick |
| 2005/0071722 A1 | 3/2005 | Biles |
| 2005/0088448 A1 | 4/2005 | Hussain et al. |
| 2005/0122338 A1 | 6/2005 | Hong et al. |
| 2005/0123057 A1 | 6/2005 | MacInnis et al. |
| 2005/0134588 A1 | 6/2005 | Aila et al. |
| 2005/0134603 A1 | 6/2005 | Iourcha et al. |
| 2005/0147166 A1 | 7/2005 | Shibata et al. |
| 2005/0147308 A1 | 7/2005 | Kitamura |
| 2005/0179698 A1 | 8/2005 | Vijayakumar et al. |
| 2005/0239518 A1 | 10/2005 | D'Agostino et al. |
| 2005/0259100 A1 | 11/2005 | Teruyama |
| 2005/0262332 A1 | 11/2005 | Rappoport et al. |
| 2005/0280652 A1 | 12/2005 | Hutchins et al. |
| 2006/0020843 A1 | 1/2006 | Frodsham et al. |
| 2006/0034369 A1 | 2/2006 | Mohsenian |
| 2006/0044317 A1 | 3/2006 | Bourd et al. |
| 2006/0045359 A1 | 3/2006 | Chen et al. |
| 2006/0064517 A1 | 3/2006 | Oliver |
| 2006/0064547 A1 | 3/2006 | Kottapalli et al. |
| 2006/0103659 A1 | 5/2006 | Karandikar et al. |
| 2006/0152519 A1 | 7/2006 | Hutchins et al. |
| 2006/0152520 A1 | 7/2006 | Gadre et al. |
| 2006/0170690 A1 | 8/2006 | Leather |
| 2006/0176308 A1 | 8/2006 | Karandikar et al. |
| 2006/0176309 A1 | 8/2006 | Gadre et al. |
| 2006/0203005 A1 | 9/2006 | Hunter |
| 2006/0245001 A1 | 11/2006 | Lee et al. |
| 2006/0267981 A1 | 11/2006 | Naoi |
| 2007/0076010 A1 | 4/2007 | Swamy et al. |
| 2007/0103475 A1* | 5/2007 | Huang et al. .................. 345/522 |
| 2007/0130444 A1 | 6/2007 | Mitu et al. |
| 2007/0139440 A1 | 6/2007 | Crow et al. |
| 2007/0153907 A1 | 7/2007 | Mehta et al. |
| 2007/0268298 A1 | 11/2007 | Alben et al. |
| 2007/0273689 A1 | 11/2007 | Tsao |
| 2007/0285427 A1 | 12/2007 | Morein et al. |
| 2007/0286289 A1 | 12/2007 | Arai et al. |
| 2007/0296725 A1 | 12/2007 | Steiner et al. |
| 2008/0016327 A1 | 1/2008 | Menon et al. |
| 2008/0024497 A1 | 1/2008 | Crow et al. |
| 2008/0024522 A1 | 1/2008 | Crow et al. |
| 2008/0100618 A1 | 5/2008 | Woo et al. |
| 2008/0273218 A1 | 11/2008 | Kitora et al. |
| 2008/0278509 A1 | 11/2008 | Washizu et al. |
| 2009/0168899 A1 | 7/2009 | Schlanger et al. |
| 2009/0235051 A1 | 9/2009 | Codrescu et al. |
| 2012/0023149 A1 | 1/2012 | Kinsman et al. |

FOREIGN PATENT DOCUMENTS

| | | |
|---|---|---|
| JP | 06180758 | 6/1994 |
| JP | H08-077347 | 3/1996 |
| JP | H08-153032 | 6/1996 |
| JP | 07-101885 | 11/1996 |
| JP | H09-325759 | 12/1997 |
| JP | 09-287217 | 8/1998 |
| JP | 11195132 | 7/1999 |
| JP | 2000-148695 | 5/2000 |
| JP | 11-190447 | 1/2001 |
| JP | 2003-178294 | 6/2003 |
| JP | 2004-252990 | 9/2004 |
| KR | 100262453 | 8/2000 |

OTHER PUBLICATIONS

"Anti-aliasing"; http://en.wikipedia.org/wiki/Anti-aliasing; Mar. 27, 2006.

"Vertex Fog"; http://msdn.microsoft.com/library/en-us/directx9_c/Vertex_fog.asp?frame=true Mar. 27, 2006.

A Hardware Assisted Design Rule Check Architecture Larry Seller Jan. 1982 Proceedings of the 19th Conference on Design Automation DAC '82 Publisher: IEEE Press.

Espasa R et al: "Decoupled vector architectures", High-Performance Computer Architecture, 1996. Proceedings., Second International Symposium on San Jose, CA, USA Feb. 3-7, 1996, Los Alamitos, CA, USA, IEEE Comput. Soc, US, Feb. 3, 1996, pp. 281-290, XP01 0162067, DOI: 10.11 09/HPCA.1996.501193 ISBN: 978-0/8186-7237-8.

Foldoc, Free Online Dictionary of Computing, defintion of SIMD, foldoc.org/index.cgi?query=simd&action=Search, Nov. 4, 1994.

Defintion of "Slot," http://www.thefreedictionary.com/slot, Oct. 2, 2012.

Parhami, Behrooz, Computer Arithmetic: Algorithms and Hardware Designs, Oxford University Press, Jun. 2000, pp. 413-418.

Brown, Brian; "Data Structure and Number Systems"; 2000; http://www.ibilce.unesp.br/courseware/datas/data3.htm.

Intel, Intel Architecture Software Deveopler's Manual, vol. 1: Basic Architecture 1999 pp. 8-1, 9-1.

Graston et al. (Software Pipelining Irregular Loops On the TMS320C6000 VLIW DSP Architecture); Proceedings of the ACM SIGPLAN workshop on Languages, compilers and tools for embedded systems; pp. 138-144; Year of Publication: 2001.

SearchStorage.com Definitions, "Pipeline Burst Cache," Jul. 31, 2001, url: http://searchstorage.techtarget.com/.sDefinition/0sid5_gci214414,00.html.

Merriam-Webster Dictionary Online; Definition for "program"; retrieved Dec. 14, 2010.

Definition of "queue" from Free on-Line Dictionary of Computing (FOLDOC), http://folddoc.org/index.cgi?query=queue&action=Search, May 15, 2007.

A Parallel Alogorithm for Polygon Rasterization Juan Pineda Jun. 1988 ACM.

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press Aug. 1981.

Blythe, OpenGL section 3.4.1, Basic Line Segment Rasterization, Mar. 29, 1997, pp. 1-3.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press, Aug. 1978.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

\* cited by examiner

INTERRUPT HANDLING TECHNIQUES IN THE RASTERIZER OF A GPU

BACKGROUND OF THE INVENTION

Recent advances in computer performance have enabled graphic systems to provide more realistic graphical images using personal computers, home video game consoles, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The rendered images are generated using raster display technology. Raster display technology is widely used in computer graphics systems, and generally refers to the mechanism by which the grid of multiple pixels comprising an image are influenced by the graphics primitives. For each primitive, a typical rasterization system determines whether or not to "render," or write a given pixel into a frame buffer or pixel map, as per the contribution of the primitive. This, in turn, determines how to write the data to the display buffer representing each pixel.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

Figure 1:
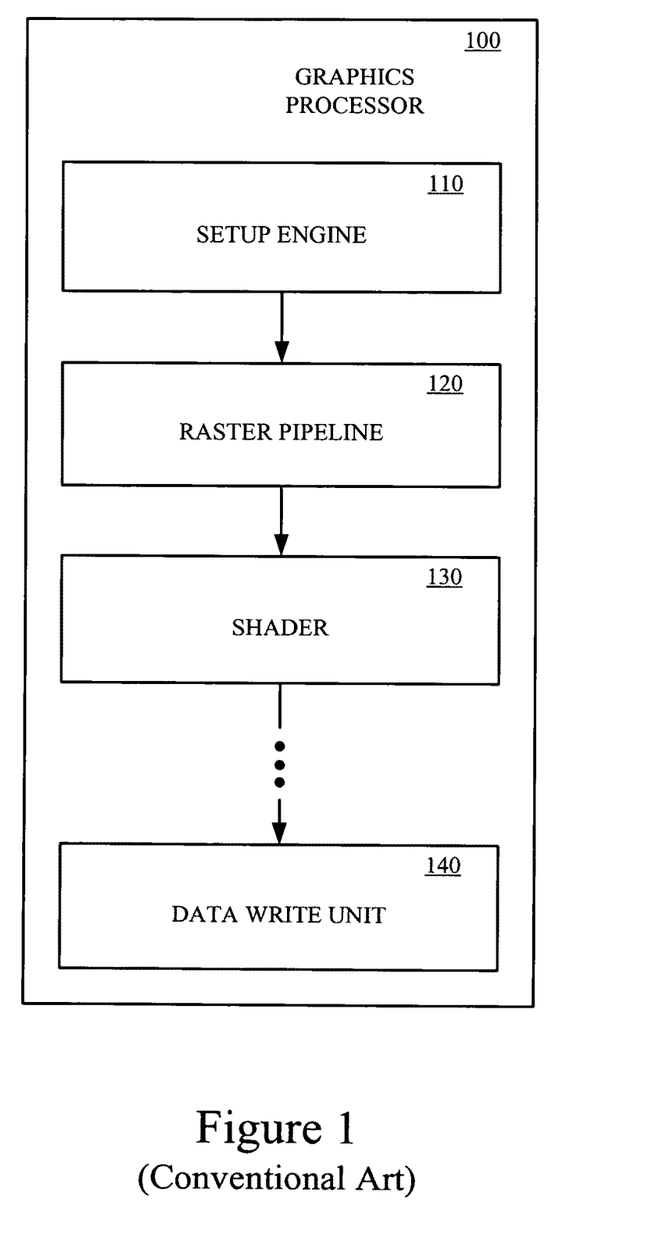
FIG. 1 shows a block diagram of a graphics processing unit according to the conventional art.

FIG. 1 shows an exemplary implementation of graphics processing unit (GPU) 100. The process performed by the GPU generally includes setting up a polygon model (e.g., a plurality of primitives) of objects, applying linear transformation to each primitive, culling back facing primitives, clipping the primitives against a view volume, rasterizing the primitives to a pixel coordinate set, shading/lighting the individual pixels using interpolated or incremental shading techniques, and the like. Accordingly, the GPU 100 hardware includes a setup engine 110, a raster pipeline 120, a shading pipeline 130, a data write unit 140, and one or more other units.

Figure 2:
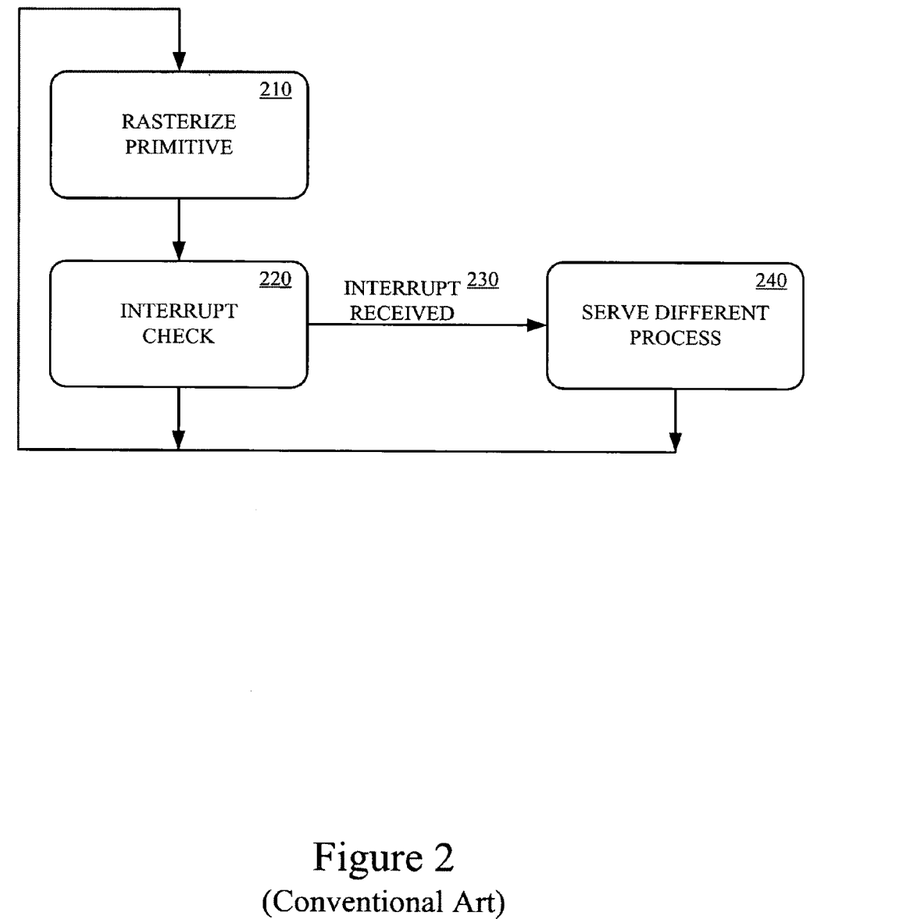
FIG. 2 shows a flow diagram of a method of handling interrupts in the raster pipeline according to the conventional art.

It is sometimes desirable to interrupt the graphics processing in the GPU to serve a different process. Referring now to FIG. 2, a method of handling interrupts in the raster pipeline according to the conventional art is shown. At 210 a current primitive of a first process is rasterized. Before or after one or more primitives are rasterized, a check is performed to determine if an interrupt has been received, at 220. If an interrupt has not been received, the method continues with rasterizing the next primitive of the first process, at 210.

If an interrupt has been received at 230, rasterization of the first process is stopped and the rasterizer serves a second process at 240. When servicing of the second process is completed, the method continues with rasterizing the next primitive of the first process at 210. If rasterization of the current primitive, particularly in the coarse rasterizer, is run until it is completed it could take an unacceptably long time before the second process is served.

SUMMARY OF THE INVENTION

As computers continue to advance there is a continuing need for improvements in the graphics processing unit (GPU). Embodiments of the present technology are directed toward interrupt handling techniques in the rasterizer of the GPU. In one embodiment, a method of handling an interrupt in a rasterizer includes starting rasterization of a first process. Periodically, a check is performed to determine if an interrupt is received during coarse rasterization of the current primitive. If an interrupt is not received, rasterization of the current primitive continues until it is completed. If an interrupt is received, the tile count of the current primitive is saved. A second process corresponding to the interrupt is then serviced after the tile count of the first process is saved. After the second process is serviced, the coarse rasterization of the first process is rerun without output until the tile corresponding to the saved tile count is coarse rasterized. Rasterization is then continued from the next tile beyond the halt point tile count until rasterization is completed.

In another embodiment, a graphics processing unit includes a rasterizer having an interrupt handler and a backing store. The rasterizer determines which pixels of a display screen are touched by a primitive. During coarse rasterization of tiles of a primitive, the interrupt handler is adapted to receive an interrupt and save a tile count, of the last tile of the current primitive coarse rasterized, in the backing store in response to the interrupt. The interrupt handler is also adapted to rerun coarse rasterization of the current primitive without output until the tile corresponding to the stored tile count is coarse reasterized after serving another context in response to the interrupt. Thereafter, rasterization of the original process can be completed.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

As computers continue to advance it is desirable to reduce the amount of time that it takes to service an interrupt request. The raster pipeline, and in particular the coarse rasterizer, of the graphics processing unit (GPU) may regularly process large primitives that cover a large number of tiles and/or pixels. Currently, it may take a few milliseconds (ms) to a few hundred milliseconds to process a large primitive, particularly on a large display screen with a relatively high resolution. Therefore, it currently takes a few milliseconds to a few hundred milliseconds to handle an interrupt in the rasterizer of the GPU. However, in the future it may be desirable to be able to switch contexts in response to an interrupt within a shorter amount of time than is required to complete the coarse rasterization of an entire primitive. In the future it is expected that it will be desirable to handle interrupts in a few millisecond to tens-of-microseconds or less.

Embodiments of the present technology include techniques for interrupting the graphics processing in a GPU to serve a different process. The techniques include context save and context replay. Upon receipt of an interrupt, context save embodiments store the state of the rasterizer at the end of coarse rasterizing a current tile of a current primitive. The incremental data and intermediate results data are saved to a backing store where they can be reloaded upon restart of the given context. Replay embodiments involve saving only the count of tiles that have already been coarse rasterized for the current primitive. After servicing another process, the coarse rasterization is then rerun without output until the coarse rasterizer is ready to produce the next tile beyond the halt point. The context save and context replay embodiments both produce a quicker interrupt response, as compared to conventional interrupt handling techniques.

Figure 3:
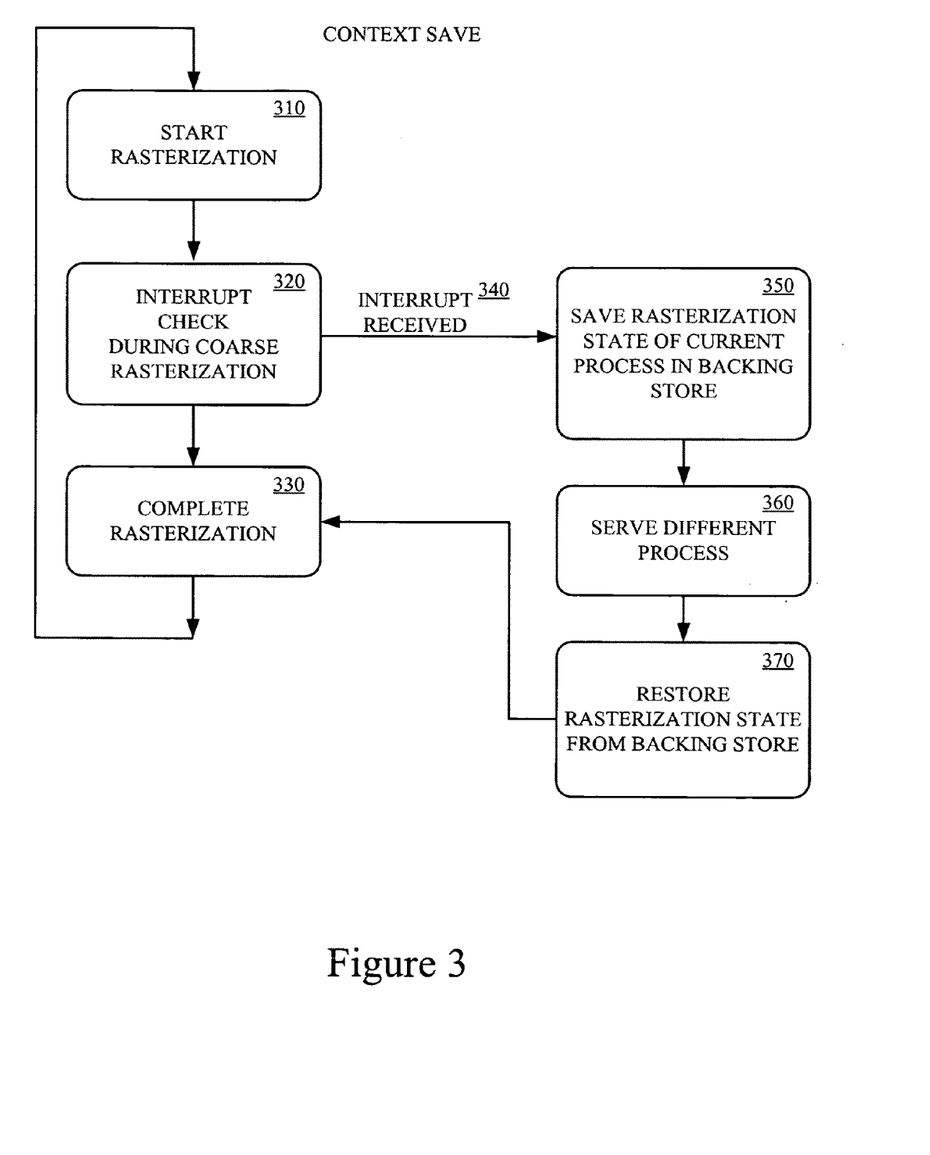
FIG. 3 shows a flow diagram of a method of handling interrupts in the raster pipeline, in accordance with one embodiment of the present technology.

Referring now to FIG. 3, a context save method of handling interrupts in the raster pipeline, in accordance with one embodiment of the present technology, is shown. The context save method will be also explained with reference to FIG. 4, which illustrates an exemplary coarse rasterization of a primitive 410. During coarse rasterization, the tiles approximating the primitive are traversed to determine which tiles are "touched" by the primitive. Various traversal algorithms have been developed for converting from the graphics primitive based description to a pixel based description. As illustrated, the tiles 420 are 2×2 groups of pixels. However, the tiles may be of any size, may be square groups, rectangular groups, non-rectangular groups or a combination of one or more group types. The coarse rasterization proceeds in a predetermined traversal order. In a unidirectional traversal order a group of tiles are coarse rasterized row-by-row in a constant direction. When the end of a row is reached the sequence shifts across the primitive to a starting location on a first side of the primitive. In a boustrophedonic traversal order, illustrated by the arrowed lines in FIG. 4, each tile is traversed by scanning back and forth along a predominant axis. As each pass moves farther along on the orthogonal axis in a serpentine pattern, that folds back and forth along the predominant axis. The boustrophedonic traversal pattern ensures that an average distance from a generated tile to the previously generated tiles is relatively small.

Figure 4:
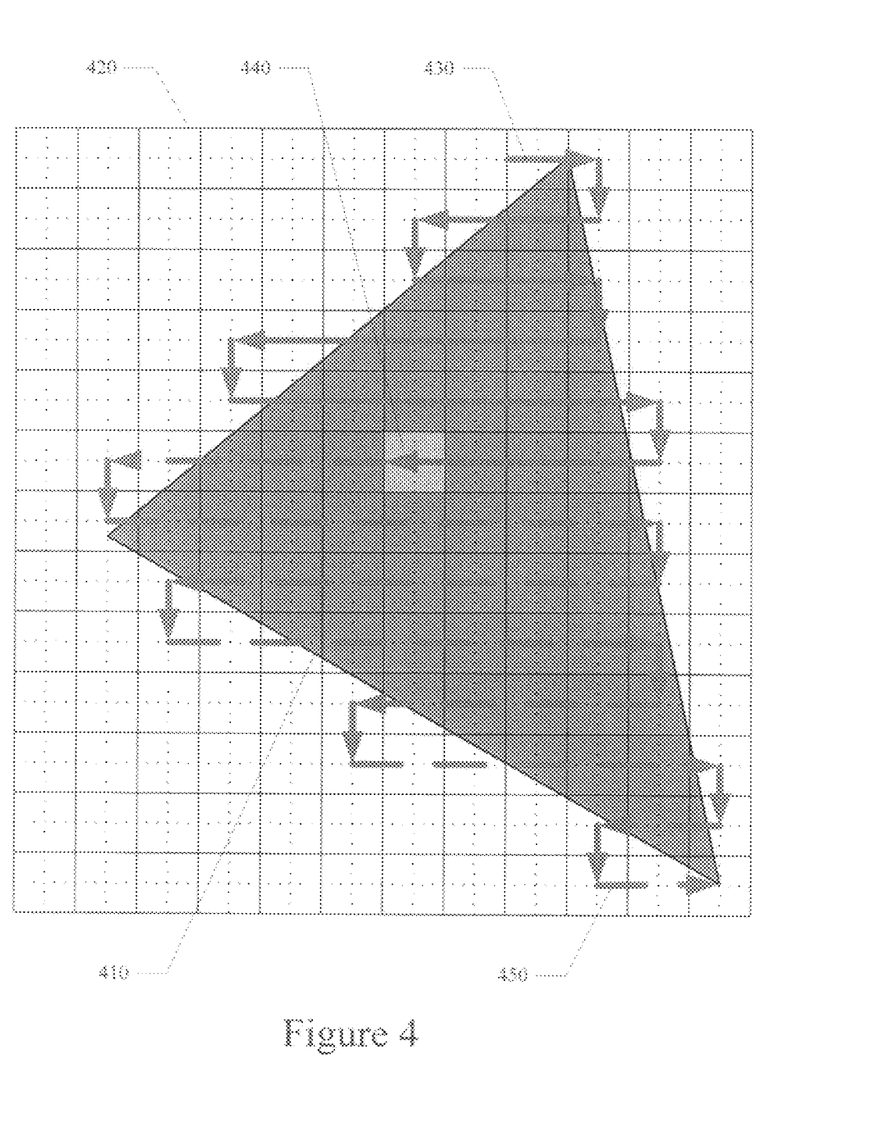
FIG. 4 shows an exemplary coarse rasterization of a primitive, in accordance with one embodiment of the present technology.

At 310, coarse rasterization of a current primitive of a first process (e.g., context) is started. Coarse rasterization determines which tiles of a screen area are related to a given graphics primitive by determining if the primitive touches a current tile as the group of tiles are traversed. As illustrated in FIG. 4, the solid portion of the traversal order 430 indicates the tiles that have already been coarse rasterized, the light shaded tile 440 represents the current tile being coarse rasterized, and the dashed portion of the traversal order 450 indicates the tiles that have not been coarse rasterized yet. Periodically during coarse rasterization of each primitive, a check is performed to determine if an interrupt has been received, at 320. The interrupt check may be performed one or more times during the coarse rasterization of the current primitive of the first process. For example, the interrupt check may be performed after each tile is coarse rasterized, or after each set of a predetermined number of tiles (e.g., every ten tiles) are coarse rasterized. If an interrupt has not been received, the method continues with coarse rasterizing the current primitive of the first process until it is completed, at 330. The method then continues by starting coarse rasterization of the next primitive at 310.

If an interrupt has been received at 340, the state of the rasterizer is saved to a backing store at 350. The saved raster state information in the backing store may include incremental data and intermediate data results, such as the last tile processed, the traversal order, the traversal limits, the bounds of the primitive, the traversal direction, the description of the edges bounding the primitive, the current distance from those edges, the plane of the primitive and the current depth of the plane, and/or the like. It may not, however, be necessary to save state information such as the number of tiles selected/produced thus far when saving the full state. The state of the rasterizer is saved at the end of coarse rasterizing the current tile of the current primitive when the interrupt was determined, which is referred to as the halt point. In another implementation, the halt point may be after processing of a predetermined interval of tiles (e.g., every ten tiles) which occurs after the interrupt was determined. The rasterizer serves a second process at 360, after the raster state of the first process is stored. When servicing of the second process is completed, the raster state of the first process including incremental data and intermediate results are restored from the backing store, at 370. After the state of the first process is restored, rasterization of the current primitive of the first process is continued until it is completed, at 330. The first process is continued from the last tile processed before the interrupt halted the first process. The method then continues by starting rasterization of the next primitive at 310.

Figure 5:
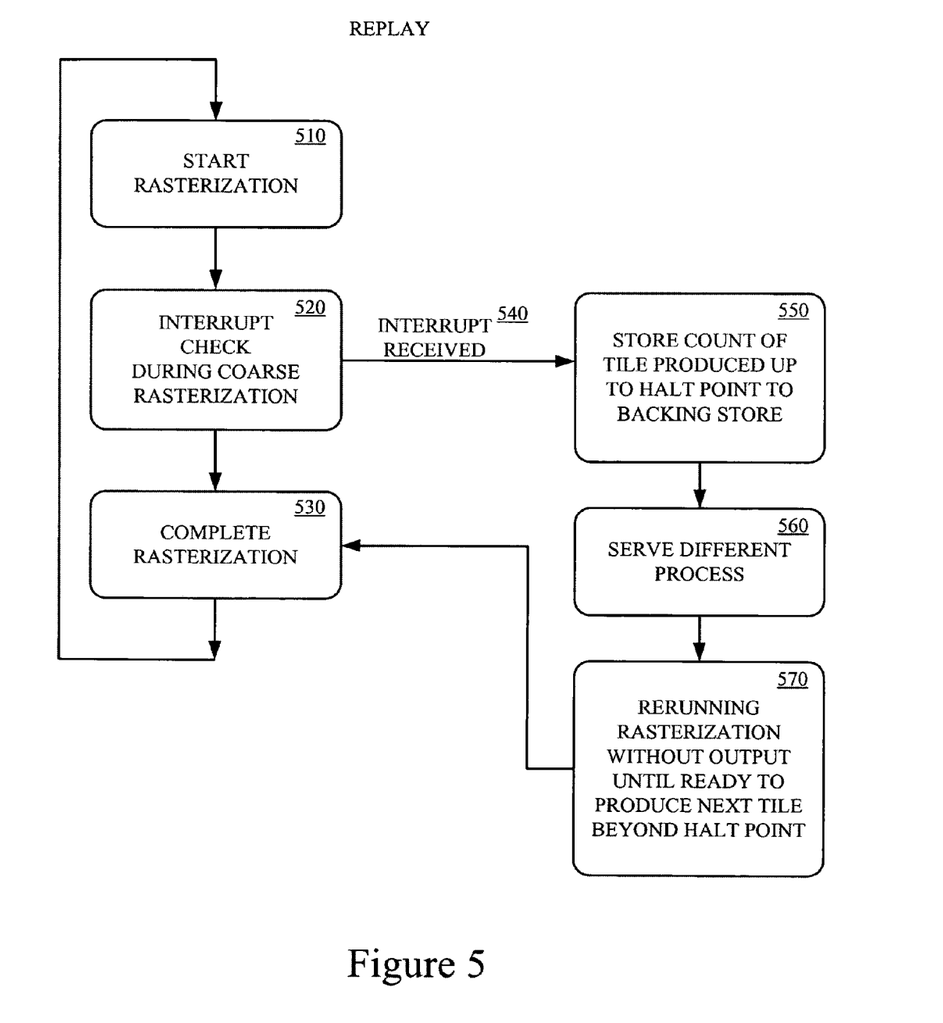
FIG. 5 shows a flow diagram of a method of handling interrupts in the raster pipeline, in accordance with another embodiment of the present technology.

Referring now to FIG. 5, a replay method of handling interrupts in the raster pipeline, in accordance with one embodiment of the present technology, is shown. At 510, rasterization of a current primitive of a first process (e.g., context) is started. Periodically during coarse rasterization of each primitive, a check is performed to determine if an interrupt has been received, at 520. The interrupt check may be performed one or more times during the coarse rasterization of the current primitive of the first process. If an interrupt has not been received, the method continues with rasterizing the current primitive of the first process until it is completed, at 530. The method then continues by starting rasterization of the next primitive at 510.

If an interrupt has been received at 540, the count of tiles produced up to the halt point is stored to a backing store at 550. The halt point is the current tile of the current primitive that was processed before receipt of the interrupt was determined. Alternatively, the rasterization of the current primitive of the first process stops after coarse rasterization of a predetermined interval of tiles. In such an implementation, the tile count corresponds to the last tile in the predetermined interval of tiles that was coarse rasterized before rasterization of the current process stopped in response to the received interrupt. The rasterizer serves a second process at 560, after the tile count is stored. When servicing of the second process is completed, the tile count is retrieved from the backing store and coarse rasterization of the first process is rerun without output until the coarse rasterizer is ready to produce the next tile beyond the tile count, at 570. After the coarse rasterization of the first process is rerun without output, rasterization of the current primitive of the first process is continued until it is completed, at 530. By rerunning the coarse rasterization without output, the incremental data and intermediate data results needed to continue coarse rasterizing the tiles that were not processed yet are generated. The method then continues by starting rasterization of the next primitive at 510.

Figure 6:
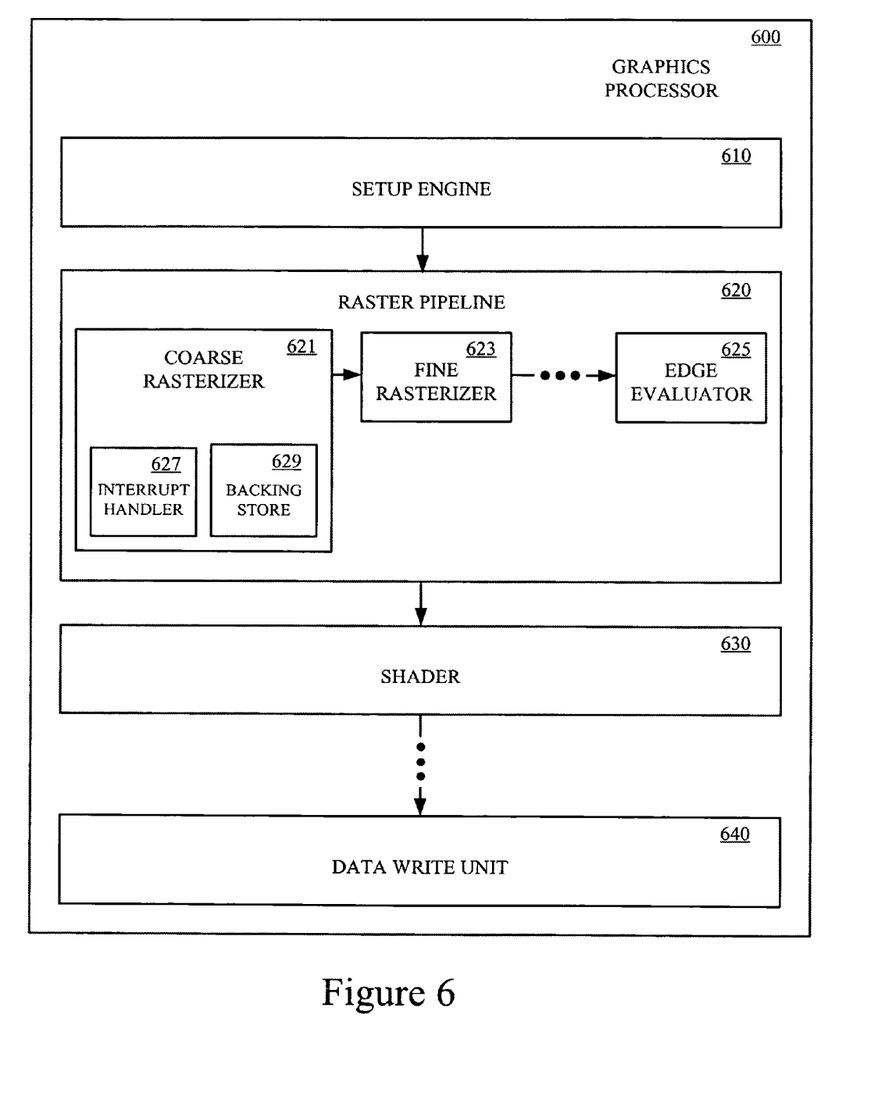
FIG. 6 shows a block diagram of a graphics processing unit, in accordance with one embodiment of the present technology.

Referring now to FIG. 6, an exemplary graphics processing unit (GPU) 600, in accordance with one embodiment of the present technology, is shown. The process performed by the GPU 600 generally includes setting up a polygon model (e.g., a plurality of primitives) of objects, applying linear transformation to each primitive, culling back facing primitives, clipping the primitives against a view volume, rasterizing the primitives to a pixel coordinate set, shading/lighting the individual pixels using interpolated or incremental shading techniques, and the like. Accordingly, the GPU 600 typically includes a setup engine 610, a raster pipeline 620, a shading pipeline 630, a data write unit 640, and one or more other units.

The raster pipeline 620 includes a coarse rasterizer 621, a fine rasterizer 623, an edge evaluator 625 and one or more other circuits. The coarse rasterizer determines which tiles of pixels are touched by each primitive of an image to be rendered. The coarse rasterizer includes an interrupt handler 627 and a backing store 629. The interrupt handler 627 receives interrupts, and saves the state of the rasterizer in response to receipt of an interrupt. The interrupt handler 627 also restores the state of the rasterizer after serving another context in response to receipt of an interrupt. The backing store 629 is utilized by the interrupt handler 627 to store the state information of the rasterizer. The interrupt handler 627 may be implemented as software, firmware, hardware or a combination thereof. In one implementation, the interrupt handler 627 may be implemented in one or more computing device readable media containing a plurality of instructions which when executed cause the rasterizer to receive the interrupt, save the state of the rasterizer at the end of coarse rasterizing the current tile of the current primitive in response to an interrupt, and restore the state of the rasterizer after serving another context. The backing store 629 may be implemented as one or more computing device readable media (e.g., cache) for storing the state of the rasterizer.

Alternatively, the interrupt handler 627 receives interrupts, and saves a tile count of the last tile of the current primitive that was coarse rasterized. The interrupt handler 627, after servicing another context, in response to receipt of an interrupt, also reruns coarse rasterization of the first context without output until the tile corresponding to the stored tile count is coarse rasterized. The backing store 629 is utilized by the interrupt handler 627 to store the tile count.

The fine rasterizer 623 determines which pixels in the tiles touch the primitive, for those tiles that the coarse rasterizer 621 determined to touch a primitive. The edge evaluator 625 computes the edge equation, $Ax+By+C>0$, for all samples, x and y, and all edges of each primitive, to determine which pixels are touched by an edge of the primitive.

Figure 7:
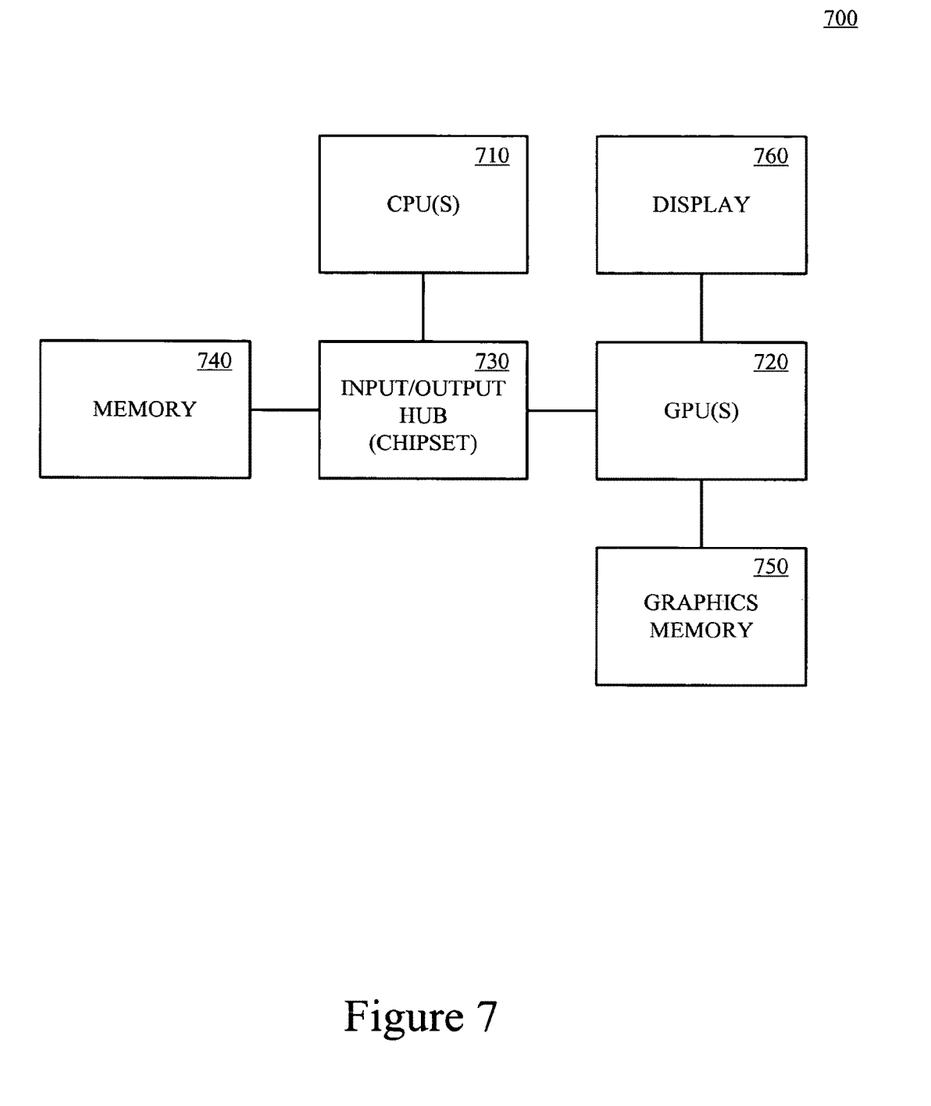
FIG. 7 shows a block diagram of exemplary computing device architecture for implementing embodiments of the present technology.

Referring now to FIG. 7, an exemplary computing device 700 for implementing embodiments of the present invention is shown. The computing device 700 may be a personal computer, server computer, client computer, laptop computer, game console, hand-held device, minicomputer, mainframe computer, distributed computer system, embedded computer, system on a chip, or the like. In addition to standard computers, the computing device may be used to implement car dashboards, kiosks, pachinko machines, slot machines, television sets, industrial controls, medical devices, wearable devices embedded in clothing, eyeglasses or wristbands, and other such applications. The computing device 700 includes one or more central processing units (CPU) 710, one or more graphics processing units (GPU) 720, an input/output hub 730, one or more computing device-readable media 740, 750, a display device 760, and one or more other input/output (I/O) devices (not shown). The additional I/O devices may include a network adapter (e.g., Ethernet card), CD drive, DVD drive, a keyboard, a pointing device, a speaker, a printer, and/or the like.

The computing device-readable media 740, 750 may be characterized as primary memory and secondary memory. Generally, the secondary memory, such as magnetic storage, optical storage and/or holographic storage, provides for non-volatile storage of computer-readable instructions and data for use by the computing device 700. For instance, a disk drive may store the operating system (OS) and applications and data. The primary memory, such as system memory and/or graphics memory 750, provides for volatile storage of computer-readable instructions and data for use by the computing device 700. For instance, the system memory may temporarily store a portion of the operating system and a portion of one or more applications and associated data that are currently used by the CPU 710, GPU 720 and the like.

The computing device-readable media 740, 750, I/O devices 760, and GPU 720 may be communicatively coupled to the processor 710 by the input/output hub 730 and one or more busses. The input/output hub 730 may be a simple hub or a chip set, such as a northbridge and southbridge. The input/output hub 730 provides for communication of data and instructions between the processor 710 and the computing device-readable media 740, 750, I/O devices 760, and GPU 720. In the case of a northbridge/southbridge chip set, the northbridge 170 provides for communication with the processors 710, 720 and interaction with the system memory. The southbridge 175 provides for general input/output functions.

The GPU 720 may include a setup engine, a raster pipeline, a shading pipeline, a data write unit, and one or more other units, as illustrated and described with reference to FIG. 6. The raster pipeline of the GPU 720 includes a coarse rasterizer having an interrupt handler and a backing store. The interrupt handler and backing store may implement a context save or context replay interrupt handling technique in the rasterizer. Upon receipt of an interrupt, context save embodiments involve saving the state of the rasterizer after coarse rasterizing a current tile of a current primitive. Incremental data and intermediate results data are saved to a backing store where they can be recovered and reloaded upon restart of the given context. Replay embodiments involves saving only the count of the last tile that has been coarse rasterized for the current primitive. The rasterization is then rerun without output until the coarse rasterizer is ready to produce the next tile beyond the halt point.

Context save and context replay interrupt handling each produce a quicker interrupt response, as compared to conventional interrupt handling techniques. Furthermore, the context save interrupt handling advantageously produces a quicker recovery response than replay, at the expense of substantial state storage. In contrast, the replay interrupt handling advantageously produces a quick halt response and requires a smaller amount of state storage but results in a longer recovery process, as compared to context save.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A method of handling an interrupt in a rasterizer comprising:
    starting coarse rasterization of a current primitive of a first process to determine which pixels of a display screen are related to the current primitive;
    determining, during coarse rasterization of the current primitive, if an interrupt is received;
    continuing coarse rasterization of the current primitive until it is completed, if the interrupt is not received;
    storing a tile count of the current primitive of the first process corresponding to a halt point, if the interrupt is received during coarse rasterization of the current primitive;
    servicing a second process corresponding to the interrupt after the count of the current tile rasterized of the current primitive of the first process is saved;
    rerunning coarse rasterization of the current primitive, after servicing the second process, without output until the tile corresponding to the halt point tile count is rasterized; and
    continuing coarse rasterization of the current primitive with output, after rerunning coarse rasterization of the current primitive, from the next the beyond the halt point tile count until coarse rasterization of the current primitive is completed.

2. The method according to claim 1, further comprising periodically checking for the interrupt during coarse rasterization of the current primitive.

3. The method according to claim 2, wherein periodically checking for the interrupt comprises determining if the interrupt is received after coarse rasterization of each tile of the current primitive.

4. The method according to claim 2, wherein periodically checking for the interrupt comprises determining if the interrupt is received after coarse rasterization of each set of a predetermined number of tiles of the current primitive.

5. The method according to claim 1, wherein the rasterization comprises determining which tiles the current primitive touches.

6. The method according to claim 1, wherein the halt point corresponds to a current coarse rasterized tile when the interrupt is received.

7. The method according to claim 1 wherein the halt point corresponds to a last coarse rasterized tile in a predetermined interval of tiles after the interrupt is received.

8. One or more non-transitory computing device readable media containing a plurality of instructions which when executed cause a computing device to implement a method comprising:
    rasterizing one or more primitives of a first context;
    storing a tile count of tiles of a current primitive of the one or more primitives of the first context that have been coarse rasterized, if an interrupt is received during, coarse rasterizing of the current primitive;
    rasterizing one or more primitives of a second context in response to the received interrupt after storing the tile count;
    rerunning coarse rasterization of the current primitive of the first context without output until the tile corresponding to the stored tile count is coarse rasterized, after the second context is served; and
    continuing rasterization of the current primitive of the first context from the next tile beyond the stored tile count until rasterization is completed, after the second context is served.

9. The one or more non-transitory computing device readable media containing a plurality of instructions which when executed cause a computing, device to implement the method according to claim 8, further comprising periodically checking for the interrupt during coarse rasterization of the current primitive of the first context.

10. The one or more non-transitory computing device readable media containing a plurality of instructions which when executed cause a computing device to implement the method according to claim 9, wherein periodically checking for the interrupt comprises determining if the interrupt is received after coarse rasterization of each tile.

11. The one or more non-transitory computing device readable media containing a plurality of instructions which when executed cause a computing device to implement the method according to claim 9, wherein periodically checking for the interrupt comprises determining if the interrupt is received after coarse rasterization of each set of a predetermined number of tiles.

12. The one or more non-transitory computing device readable media containing a plurality of instructions which when executed cause a computing device to implement the method according to claim 8, wherein rasterization of the one or more primitives of a first context stops at a current tile of the first context and rasterizing one or more primitives of a second context in response to the received interrupt starts after raster of the current tile of the first context.

13. The one or more non-transitory computing device readable media containing a plurality of instructions which when executed cause a computing device to implement the method according to claim 8, wherein rasterization of the one or more primitives of a first context stops after coarse rasterization of a predetermined interval of tiles of the first context and rasterizing one or more primitives of a second context in response to the received interrupt starts after coarse rasterization of the predetermined interval of tiles of the first context.

14. A graphics processing unit comprising:
    a rasterizer for determining which pixels of a display screen are touched by a primitive, wherein the rasterizer includes;
    a coarse rasterizer for determining a set of tiles that touch a current primitive;
    an interrupt handler for receiving an interrupt, saving a tile count of a last tile of the current primitive coarse rasterized in response to receiving the interrupt during coarse rasterizing the current primitive, and rerunning coarse rasterization of the current primitive without output until the tile corresponding to the stored tile count is rasterized after serving another context in response to receiving the interrupt; and
    a backing store for storing the tile count.

15. The graphics processing unit of claim 14, further comprising a fine rasterizer coupled to the coarse rasterizer, wherein the fine rasterizer determines which pixels, of the set of tiles, touch the current primitive.

16. The graphics processing unit of claim 15, further comprising an edge evaluator coupled to the fine rasterizer, wherein the edge evaluator determines which of the pixels touch an edge of the current primitive.

17. The graphics processing unit of claim 14, wherein the interrupt handler comprises one or more computing device readable media containing a plurality of instructions which when executed operate to receive the interrupt, save the tile count of the last tile of the current primitive coarse rasterized, and rerun coarse rasterization of the current primitive without output until the tile corresponding to the stored tile count is coarse rasterized after serving another context.

18. The graphics processing unit of claim 14, wherein the backing store comprises one or more computing device readable media for storing the tile count.

* * * * *